(12) United States Patent
Koptiw, Jr. et al.

(10) Patent No.: US 6,973,174 B1
(45) Date of Patent: Dec. 6, 2005

(54) SERVICE INTERACTION MEDIA IN AN INTELLIGENT NETWORK ENVIRONMENT

(75) Inventors: Michael A. Koptiw, Jr., Red Bank, NJ (US); Steve A. Sazegari, Eatontown, NJ (US)

(73) Assignee: AT & T Corp., Bedminster, NJ (US)

( * ) Notice: Subject to any disclaimer, the term of this patent is extended or adjusted under 35 U.S.C. 154(b) by 403 days.

(21) Appl. No.: 09/912,974

(22) Filed: Jul. 25, 2001

(51) Int. Cl.$^7$ .............................................. H04M 7/00
(52) U.S. Cl. ................. 379/229; 379/201; 379/221.08; 379/221.09; 379/221.12
(58) Field of Search ...................... 379/221.08, 221.09, 379/221.12, 201

(56) References Cited

U.S. PATENT DOCUMENTS

| | | | |
|---|---|---|---|
| 5,825,860 A * | 10/1998 | Moharram | ................... 379/133 |
| 5,953,404 A * | 9/1999 | Fikis et al. | ................... 379/230 |
| 5,999,610 A | 12/1999 | Lin et al. | |
| 6,185,289 B1 * | 2/2001 | Hetz et al. | ................... 379/220 |
| 6,570,855 B1 * | 5/2003 | Kung et al. | ................... 370/237 |

* cited by examiner

*Primary Examiner*—Harry S. Hong
*Assistant Examiner*—Marie C. Ubiles

(57) ABSTRACT

In an Intelligent Network, a Service Interaction Media (SIM) device comprising a call handler and a plurality of service code tables manages multiple and simultaneous communications between a service input node such as a Service switching Point (SSP) and at least one network element. The service code tables contain decision information and lists of service interaction scenarios to enable the call handler to manage queries and sessions with network elements. An incoming query is presented from the switch to the SIM through the call handler and the SIM derives a service code based on query information to apply appropriate features and services to the query.

5 Claims, 2 Drawing Sheets

SERVICE INTERACTION MEDIA IN AN INTELLIGENT NETWORK ENVIRONMENT

FIELD OF THE INVENTION

The present invention relates to a telecommunications network and, more particularly, to a method for querying multiple network elements such that the resulting responses are properly integrated.

BACKGROUND OF THE INVENTION

Telecommunications service providers now employ Advanced Intelligent Networks (AIN) to provide advanced features to subscribers. Within such networks are various databases and nodes. These different databases and service nodes may be dedicated for 8YY & 900 services, Local Number Portability (LNP), VPN (virtual private network) services, consumer services and routing, for example. Thus, a carrier would likely have different databases and service nodes and many of the databases and service nodes would be dedicated to each of their functions.

In a typical AIN, an incoming call is received at a switching system (commonly referred to as a Service Switching Point or SSP). The receipt of a call causes the SSP to generate a trigger and query a Service Control Point (SCP) to obtain therefrom information on call handling or service interaction scenarios. This data is sent via bi-directional SS7 data links to intermediate nodes, commonly referred to as Service Transfer Points (STPs) that transport messages between network nodes. The result is that data is routed to its intended destination.

Often, queries are made sequentially. When network elements or service nodes are queried sequentially, the SSP sends a query to a signaling network in response to a trigger. The embedded signaling network will query one network element at a time according to a predetermined sequence. Often, a response from one network element must be received and interpreted before querying a second network element which must be completed before advancing to other network elements. After receiving all responses from various network elements, the final response is formulated and returned to the SSP. This method of sequential querying is inefficient and slow because responses must be processed in turn rather than in parallel. As a result, the performance of the network is negatively impacted. Likewise, logic for different applications often resides in different network elements and systems. Such a distributed environment with complex services is difficult to manage which necessitates inefficient sequential querying.

Undesirable feature interaction between service information from each network element or service node has been problematic such that when a plurality of network elements or SCPs are queried where each network element or SCP has a different feature, the result is variable and depends on the execution or operation of the network elements or SCPs.

Attempts have been made to manage communications and feature interactions among nodes in an AIN. One solution to the problem is the use of a mediation point (MP) in the network that is interposed between the SSP and one or more SCPs. Data from the SSP travels through data links to the MP which is then routed to any number of connected SCPs. Thus, services can be distributed over different SCPs. The MP minimizes the impact of feature interactions between the SSP and SCPs. For example, U.S. Pat. No. 5,999,610 to Lin et-al. (incorporated herein in its entirety) discloses an AIN comprising at least one SSP connected through data links to the MP which is connected through data links to one or more SCPs. The SSP responds to a trigger which occurs either during originating of call processing or during terminating of call processing. Although this method provides for parallel queries, such a methodology does not permit effective multiple, simultaneous signaling to service nodes, intelligent peripherals and other databases and does not provide for a separation of the SSP with the trigger. As a result, the network lacks flexibility and is not fully applicable to a broad range of complex services. Further, complex interworking between protocols must be done in the SSP, which would be a bottleneck to network evolution.

Thus, a need exists in the art for managing communications in a telecommunications network such that multiple, simultaneous signaling to service nodes, intelligent peripherals and other databases as well as network evolution can be performed efficiently.

SUMMARY OF THE INVENTION

The present invention overcomes many of the shortcomings discussed above by providing a Service Interaction Media (SIM) in an Advanced Intelligent Network (AIN) or the like such that queries to multiple databases or network elements can be sent in a variety of ways, such as in parallel, sequentially and/or in a mixed format and the resulting responses are properly integrated and complex services are managed effectively in a distributed environment where logic for different applications resides in different network elements and systems.

It was discovered that providing a service code table for managing feature interaction that is separate from the SSP and is incorporated with a Call Handler for managing communication in a SIM not only provides greater control to the device but also allows increased flexibility and greater applicability to a broader range of complex services.

According to one exemplary aspect of the invention, a SIM (Service Interaction Media) device is incorporated into an AIN, the SIM communicating with an SSP via a defined Application Programming Interface (API). The SIM comprises a Call Handler and one or more Service Code Tables. The Call Handler manages communication between the SSP and the SIM and manages queries and sessions with other network elements including, but not limited to, SCPs, SN/IPs, routing databases, recording systems and/or billing systems. The Service Code Tables provide a comprehensive list of service interaction scenarios and data for decision information that instruct the Call Handler. Information about the incoming call is utilized by the Service Code Tables to determine the services to be applied to the call. In this way, feature interaction is predefined.

The organization and operation of this invention will be better understood from a consideration of the detailed description of the illustrative embodiments thereof which follow. Although the invention has been defined using the appended claims these claims are exemplary and limiting only to the extent that the invention is meant to include one or more elements from the apparatus and/or methods described herein and in the applications incorporated by reference in any combination or sub-combination. Accordingly, there are any number of alternative combinations for defining the invention, which incorporate one or more elements from the specification in any combination or sub-combination.

DETAILED DESCRIPTION OF THE PREFERRED EMBODIMENTS

The present inventive subject matter relates to a Service Interaction Media (SIM) capable of being incorporated into an AIN such that queries to multiple databases or network elements can be sent in different ways and the resulting responses are properly integrated. Examples of databases or network elements may include, but are not limited to, a Service Control Point (SCP), service node/intelligent peripheral (SN/IP), routing database, or recording/billing systems. Performance in such a network is improved because queries can be sent more efficiently in parallel rather than sequentially. Further, complex services may be effectively managed in a distributed environment where logic for different applications logic resides in different network elements and systems. The SIM may further handle the interworking between protocols that occurs with such querying.

Figure 1:
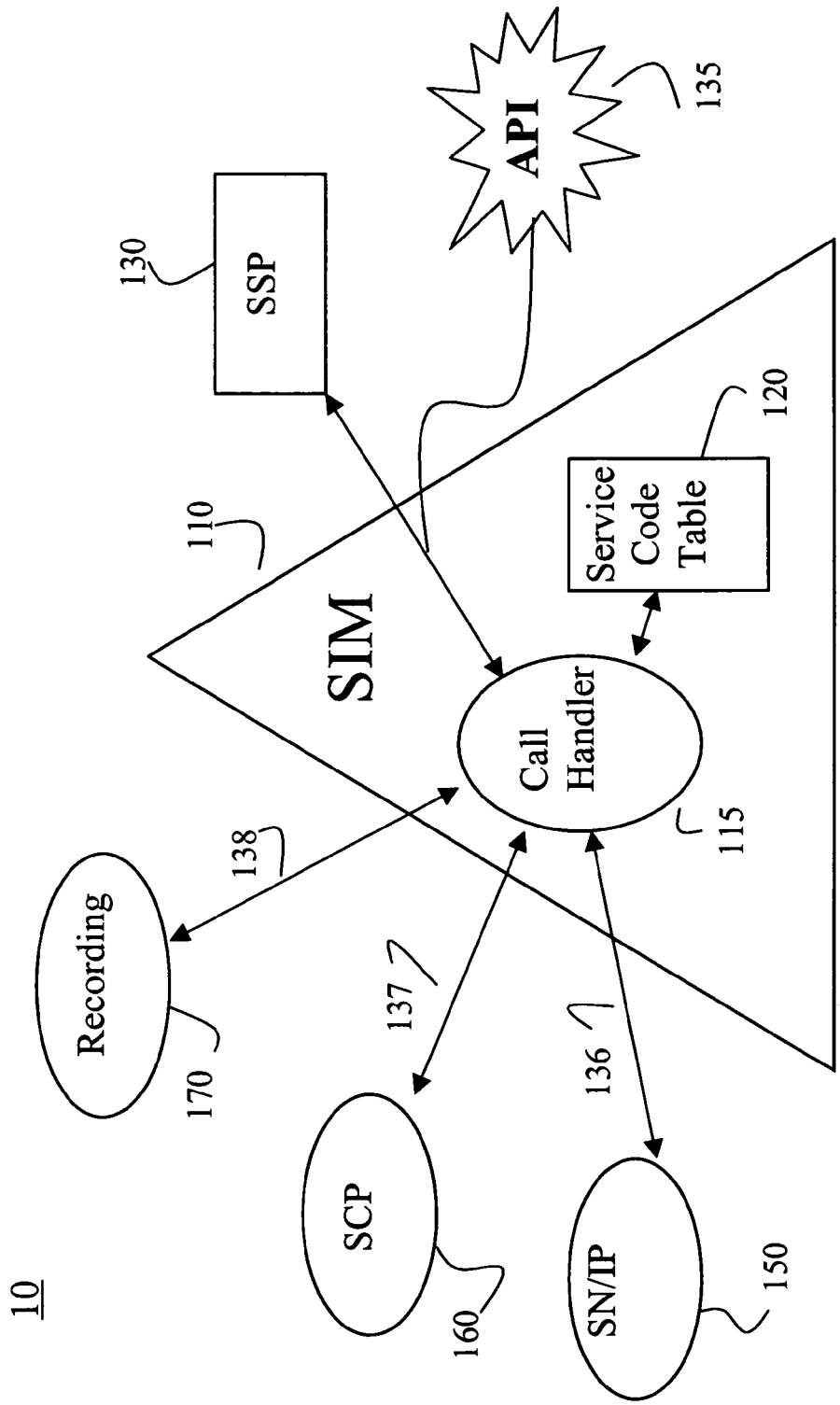
FIG. 1 shows an exemplary embodiment of a network architecture incorporating a SIM of the present invention.

An illustrative methodology and system for managing communications in an Advanced Intelligent Network according to the present invention is described. FIG. 1 shows an Advanced Intelligent Network (AIN) 100 comprising a SIM 110 of the present invention. The SIM 110 is a flexible, programmable device comprising a Call Handler 115 and at least one Service Code Table 120, of which only one is shown in the illustration. It should be noted that the invention is not limited to only one Service Code Table as a plurality of Service Code Tables may be used depending on the needs of the system. For example, the number of features to interact may be such that a plurality of Service Code Tables is used. The AIN 100 further comprises a SSP 130 that communicates with and is controlled by the SIM 110 via a defined API 135. The number of switches per SIM may vary depending on a network optimization process. In an illustrative embodiment, if the number of switches is "N" and the number of SIMS is "M", then N>>M. A non-limiting, exemplary embodiment of the defined API 135 is Parlay which is a standard group defining API for various media interaction. Data links 136, 137, and 138 in this exemplary embodiment connect the SIM 110 to network elements. Network elements included in the exemplary embodiment are service node/intelligent peripherals (SN/IP) 150, Service Control Points (SCP) 160, and Recording Systems 170, of which only one of each is illustrated, however, the network elements are not so limited. For example, the network elements may also include billing systems or routing databases, to name a few.

The Call Handler 115 manages communication between the SSP 130 and the SIM 110. When a call originates at the SSP 130, certain processing is needed depending on the nature of the call. A Service Code Table 120 of the SIM 110 may use call information to determine which set of services is to be applied to the incoming call. In this way, call information such as trunk type of the call at the SSP 130 may be evaluated such that the call can be properly classified within the SIM 110 based on a derived service code. This classification of the call within the SIM 110 can be based on features and services that will be applied to the call. Call information may also comprise ANI or dialed number, for example. Construction of the service code in the SIM 110 can be accomplished through evaluation of various parameters. These parameters include, but are not limited to, features based on screening, routing, translations, authorization, recording, user-network interaction, and Internet services. The Call Handler 115 may further manage the communication between the SIM 110 and other network elements such as Service Node/Intelligent Peripherals (SN/IP) 150, SCP 160 or Recording systems 170, to name a few and can utilize the Service Code Tables 120 of the SIM for decision information. For example, the SIM 110 may formulate a number of queries to service databases and may establish a session with end-user call processing elements such as a Service Node or Intelligent Peripheral based on the derived service code within the SIM 110. The Service Code Tables of the SIM 110 contain comprehensive lists of service interaction scenarios thus allowing feature interactions to be predefined within the network.

Further, the SIM may include interfaces to Signaling System 7 (SS7) protocols and provide the interworking between SS7, Integrated Services Digital Network User Port (ISUP), Basic Rate Interface (BRI), Primary Rate Interface (PRI), Simple Internet Protocol-TCAP/Telecom (SIP-T), and the potentially upcoming packet based transport network Bearer Independent Call Control (BICC).

Figure 2:
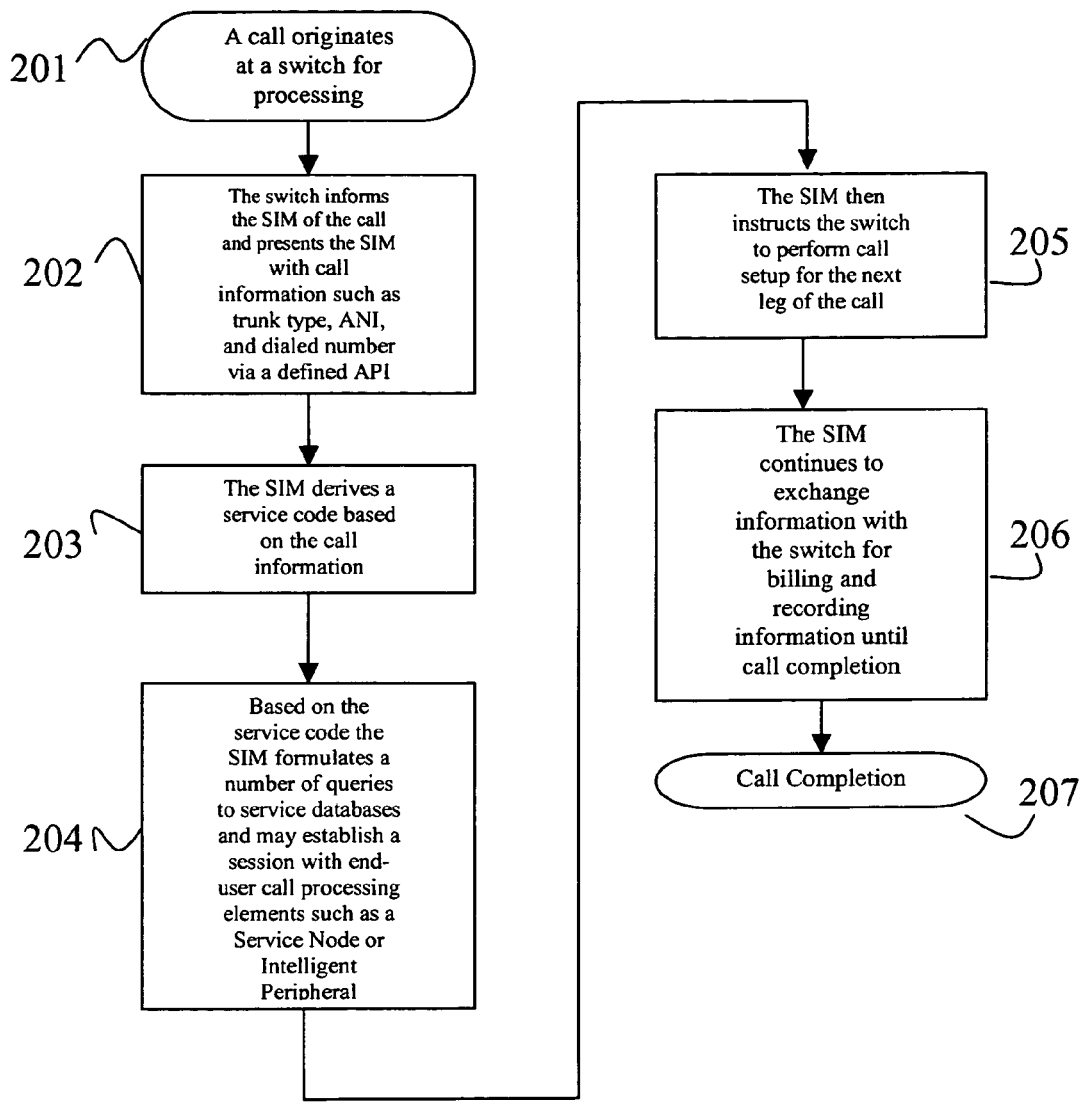
FIG. 2 is a flowchart illustrating the method of managing communications according to an exemplary embodiment of the present invention.

Referring to FIGS. 1 and 2, an exemplary embodiment includes receiving a call at the SSP 130 (step 201, FIG. 2). This call would require processing, and the type and manner of processing being determined through the derivation of a service code. The SSP 130 can communicate and notify the SIM 110 of the presence of the call through the Call Handler 115 of the SIM 110 (step 202, FIG. 2). The SSP 130 may further present call information to the Call Handler 115 of the SIM 110 via a defined API. As an example of the defined API, recommended standards established by the Parlay standards body may be used. The call information presented by the SSP 130 to the SIM 110 is processed. The information may include trunk type, ANI, or dialed number, for example. The SIM 110 can process the call information to derive a service code which can classify the call based on features and services that will be applied to the call. The SIM 110 further comprises Service Code Tables 120 that provide comprehensive lists of service interaction scenarios. Construction of the service code can be based on features such as screening, routing, translations, authorization, recording, user-network interaction, or Internet services, for example (step 203, FIG. 2). The SIM 110 can then formulate a number of queries through the Call Handler 115 to service databases which may include establishing a session with end-user call processing elements based on the derived service code (step 204, FIG. 2). The SIM 110 can then continue to communicate with the SSP 130 through the Call Handler 115 via the defined API 135 to perform call setup to another switch, a terminating party or to a Service Node or Intelligent Peripheral for the next leg of the call (step 205, FIG. 2). The process may continue until call completion, for example, at which time the SIM 110 ceases information exchange with the SSP 130 for billing and recording information (steps 206 and 207, FIG. 2).

The SIM device 110, comprising the Call Handler 115 and at least one Service Code Table 120, enables parallel queries in an Intelligent Network environment. The Service Code Tables 120 provide for derivation of service codes for managing feature interaction. Thus, the SIM enhances flexibility of the Intelligent Network and permits application to a wide range of complex services. In an illustrative embodiment, the SIM provides for multiple, simultaneous signaling to service node, intelligent peripheral, and other databases; a Call Handler that can respond to network triggers and service code tables that can provide network triggers; a signaling gateway to ATM, IP; an interface to the switch, global title translation and flexible protocols in addition to TCAP.

Further, the SIM device could be used in global title translation. In this embodiment, the SIM device would translate a global title for addresses requiring the global title translation function for routing in a signaling network. For example, the SIM device could translate a global title from dialed digits to a network node address and application address.

The SIM device could also be used as an interface device between circuit-switched and packet-switched networks. In this function as a signaling gateway, the SIM device can provide an interface to ATM (Asynchronous Transmission Mode) or IP (Internet Protocol).

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method for managing multiple communications between a control point and a plurality of network elements in a telecommunications network, comprising:
    receiving at a Service Interaction media (SIM) device call information associated with a call at one of said network elements;
    deriving at the SIM device a service code based on the call information;
    formulating a service session with the one network element based on the service code; and
    controlling operation of the one network element jn response to the service session to generate an integrated reply to the control point
    wherein said deriving includes providing interworking between two different network protocols in plural network elements; and
    wherein said receiving comprises receiving the call information through an out-of-band signaling interface.

2. A method for managing multiple communications between a control point and a plurality of network elements in a telecommunications network, comprising:
    receiving at a Service Interaction media (SIM) device call information associated with a call at one of said network elements;
    deriving at the SIM device a service code based on the call information;
    formulating a service session with the one network element based on the service code; and
    controlling operation of the one network element in response to the service session to generate an integrated reply to the control point;
    wherein said deriving includes providing interworking between two different network protocols in plural network elements; and
    wherein the two different network protocols are selected from the group consisting of Signaling System 7 (SS7), Integrated Services Digital Network User Port (ISUP), Basic Rate Interface (BRI), Primary Rate Interface (PRI), Simple Internet Protocol-Telecom (SIP-T) and Bearer Independent Call Control (BICC).

3. A method for managing multiple communications between a control point and a plurality of network elements in a telecommunications network, comprising:
    receiving at a Service Interaction Media (SIM) device call information associated with a call at one of said network elements;
    deriving at the SIM device a service code based on the call information;
    formulating a service session with the one network element based on the service code; and
    controlling operation of the one network element in response to the service session to generate an integrated reply to the control point;
    wherein said deriving includes providing interworking between two different network protocols in plural network elements;
    wherein said formulating includes formulating the service session with plural network elements, and accessing the network elements in parallel.

4. A method for managing multiple communications between a control point and a plurality of network elements in a telecommunications network comprising:
    receiving at a Service Interaction Media (SIM) device call information associated with a call at one of said network elements;
    deriving at the SIM device a service code based on the call information;
    formulating a service session with the one network element based on the service code; and
    controlling operation of the one network element in response to the service session to generate an integrated reply to the control point
    wherein said deriving includes providing interworking between two different network protocols in plural network elements; and
    wherein said deriving the service code includes classifying the call information.

5. The method of claim 4 wherein the service code is based on features of the call information selected from the group consisting of screening, routing, translations, authorization, recording, user-network interaction and internet services.

* * * * *